May 28, 1940.  H. SINCLAIR ET AL  2,202,271
TRANSMISSION MECHANISM
Filed Aug. 6, 1938  7 Sheets-Sheet 1

Fig. 1.

Inventors
Harold Sinclair
and
Robert C. Clerk
by
Dean Fairbanks Offred

May 28, 1940.    H. SINCLAIR ET AL    2,202,271
TRANSMISSION MECHANISM
Filed Aug. 6, 1938    7 Sheets-Sheet 2

Inventors
Harold Sinclair
and
Robert C Clerk
by
Dean Fairbank Hiester

May 28, 1940.  H. SINCLAIR ET AL  2,202,271

TRANSMISSION MECHANISM

Filed Aug. 6, 1938   7 Sheets-Sheet 4

Inventors
Harold Sinclair
and
Robert C Clark
by
Dean Fairbank & ffoes

May 28, 1940.  H. SINCLAIR ET AL  2,202,271
TRANSMISSION MECHANISM
Filed Aug. 6, 1938  7 Sheets-Sheet 7

Inventors
Harold Sinclair
and
Robert C. Clark
by
Dean Fairbank & Hirsch

Patented May 28, 1940

2,202,271

UNITED STATES PATENT OFFICE 2,202,271

TRANSMISSION MECHANISM

Harold Sinclair, Kensington, London, and Robert Cecil Clerk, Egham, England, assignors to Hydraulic Coupling Patents Limited, London, England, a company of Great Britain Application August 6, 1938, Serial No. 223,393
In Great Britain April 25, 1938

16 Claims. (Cl. 74—337)

This invention relates to mechanical coupling devices for use in rotary power transmission mechanism and to arrangements of power transmission mechanism embodying such coupling devices.

An object of this invention is to provide an improved form of controllable unidirectional coupling device, which is a modification of the Legge synchro-coupling described in Patent No. 1,862,188.

Another object is to provide change-speed gearing having an improved form of positive gear-selecting clutch.

Another object is to provide change-speed gearing providing three or more forward speeds through positive gear-selecting means, in which all changes between said speeds can be synchronously effected while the gearing is running and without necessarily disengaging a main clutch associated with the gearing.

Yet another object is to provide change-speed gearing having an improved form of self-shifting positive clutch capable of selectively establishing at least three different speed ratios.

According to the present invention, a synchro-coupling comprises a toothed first member (which is the driving or the driven member), a second member (which is the driven or the driving member), an intermediate member having teeth engageable with the teeth of said first member, said intermediate member being so engaged with said second member as to be constrained to move helically with respect thereto upon relative rotation between said intermediate and second members, and said intermediate member being capable, in the course of such helical movement, of axial displacement relative to said first member from a first position where said teeth are disengaged, through a second position where said teeth are engaged, to a third position where said teeth are again disengaged, the coupling also comprising two subsidiary ratchet drives adapted to couple said first and intermediate members and serving to effect engagement of the teeth of said first and intermediate members without clashing by moving the intermediate member from said first and third positions respectively to said second position, upon relative angular displacement of said first and second members in the two directions respectively, and control means operable for preventing said intermediate member from passing beyond said second position when moved from at least one of said first and third positions.

The improved synchro-coupling may have its intermediate member movable on the second member to a fourth position in which neither of said ratchet drives is operative so as to avoid clicking of the pawls, control means being provided whereby said intermediate member can be moved out of said fourth position to said third position.

The invention will be described, by way of example, with reference to the accompanying drawings relating to a change-speed gearing yielding three forward speed ratios and reverse and suitable for use on a road vehicle driven by an internal-combustion engine.

Figure 1:
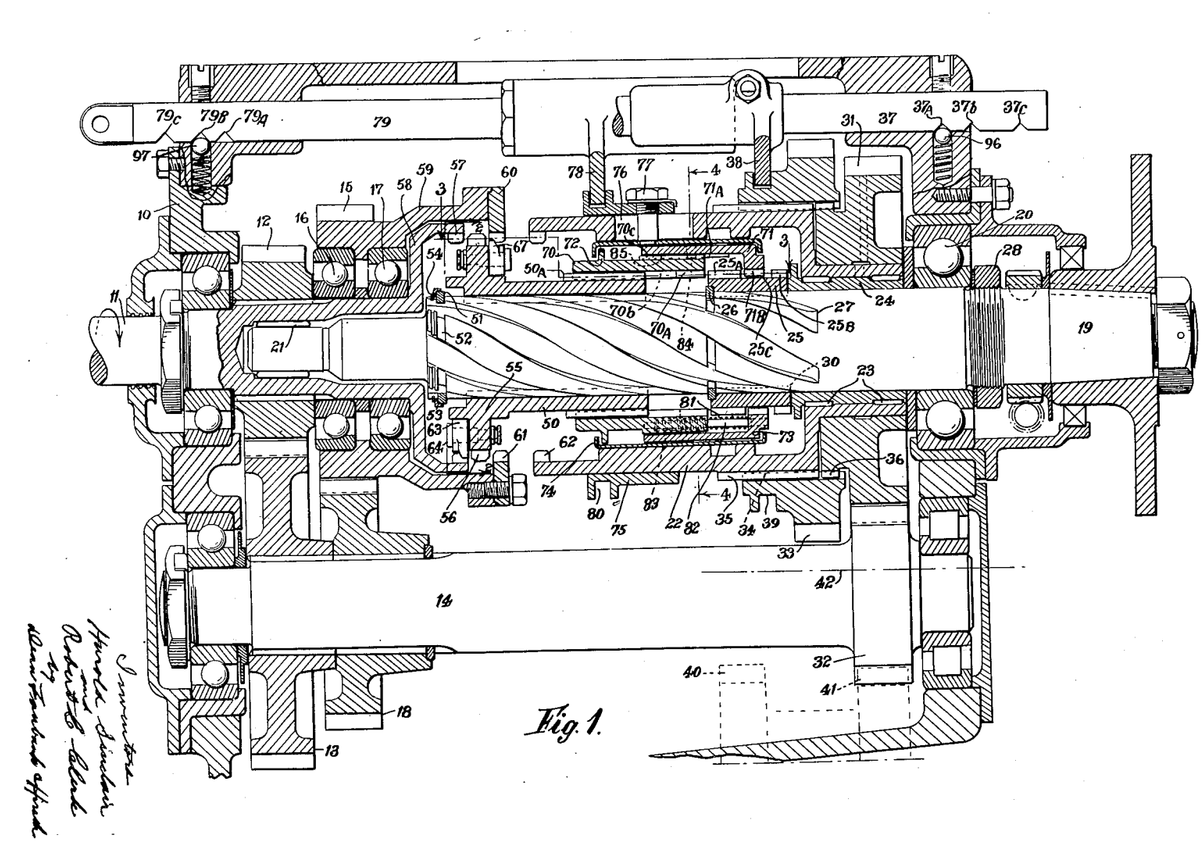
Fig. 1 is a sectional side elevation of the gearing, with part of the control mechanism omitted and with reverse idler gears in developed view.

The change-speed gearing shown in Fig. 1 includes a casing 10 in which is journalled an input shaft 11, the left hand end of which is supported by a journal bearing not shown. The shaft 11 is conveniently the driven shaft of a main clutch, such as hydraulic coupling having a drag-release control as described in Patent No. 1,978,172, or a centrifugal friction clutch, connecting the engine to the gearing. A pinion 12 fixed to the shaft 11 is in constant mesh with a gear wheel 13 fixed to a live countershaft 14. A middle-speed gear wheel 15 is journalled on the input shaft 11 by ball bearings 16 and 17 and meshes with a gear wheel 18 which is fixed to the countershaft 14 and which is smaller in diameter than the wheel 13. An output shaft 19 is journalled at 20 in the casing 10 and its left-hand end is supported by a spigot bearing 21 in a bore in the input shaft 11. A sleeve 22 is journalled by needle roller bearings 23 on a bush 24 on the output shaft. This bush is clamped, together with the inner race of the bearing 20 and a locking bush 25, between a split ring 26 and a nut 28. The ring 26 is located in a circumferential groove 29 formed in right-handed helical splines 27 in the shaft 19, and the locking bush 25 has internal splines 30 engaged with the splines 27 and maintaining a predetermined angular relationship between the bush 25 and the shaft 19. A low-gear wheel 31 is journalled on the sleeve 22 and is in constant mesh with a pinion 32 integral with the countershaft 14. A reverse gear wheel 33 having internal splines 34 is slidably mounted on splines 35 on the sleeve 22, and its splines 34 are adapted to engage splines 36 on the wheel 31. A selector rod 37 is provided with a fork 38 engaged in a circumferential groove 39 in the hub of the wheel 33.

A reverse idler cluster consists of two gear wheels 40 and 41 (shown by dotted lines in developed view). These gear wheels are journalled on a fixed shaft the axis of which is denoted by 42. The wheel 41 is in constant mesh with the wheel 32, while the wheel 40 is adapted to be engaged by the slidable reverse wheel 33, when the selector 37 is in its extreme left-hand position. When this selector is in the neutral position, the reverse wheel 33 is disengaged from both the wheels 40 and 31.

The clutch mechanism for selecting the forward gears includes an intermediate member in the form of a nut 50 which is engaged with the splines 27 on the output shaft so that it is constrained to move helically on this shaft between the ring 26 and a split ring 51 retained in a groove 52 by a flanged ring 53 and a snap ring 54. The nut 50 has a flange 55 provided on its circumference with radial teeth 56. When the nut 50 is in its extreme left-hand position, the teeth 56 mesh with teeth 57 formed on a drum 58 which is integral with the input shaft 11. To an extension 59 of the wheel 15 is fixed a ring 60 having internal teeth 61 adapted to be engaged by the teeth 56 as the nut moves to the right from the position shown. On one end of the sleeve 22 is a ring of teeth 62 adapted to be engaged by the nut teeth 56 when the nut is in its extreme right-hand position.

Figure 2:
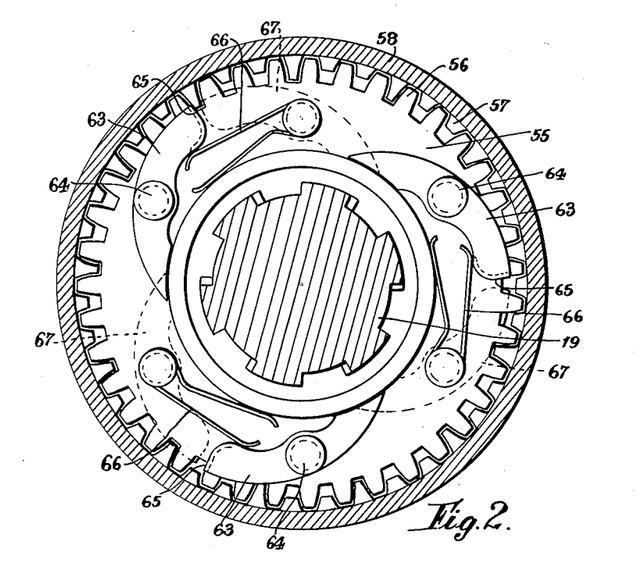
Fig. 2 is a sectional end elevation of a detail to a larger scale, taken on the line 2—2 in Fig. 1.

On the left-hand face of the flange 55 are one or more pawls 63 journalled on pins 64. The noses 65 of these pawls (Fig. 2) point in the normal direction of rotation (indicated by the arrow on the input shaft 11 in Fig. 1) and project slightly in advance (in a circumferential direction) of the leading faces of the teeth 56 that are nearest to them. The tooth clearances and the amount by which the pawls project are exaggerated in Fig. 2. Springs 66 bias the pawls outwards to the position shown. On the right-hand face of the flange 55 are one or more pawls 67 which are arranged similarly to the pawls 63, except that their noses trail with respect to the said direction of rotation and are slightly behind the trailing faces of the teeth 56 that are nearest to them.

Means for locking the nut 50 in different gear positions will now be described. The helix angle of the splines 27 on the shaft 19 is such that the nut 50 is constrained to rotate through 45° relatively to the shaft 19 when it is displaced through its full travel on this shaft, that is from contact with the stop ring 26 to contact with the stop ring 51. The nut 50 has eight axial uniformly distributed splines 50A each having a width equal to the width of the grooves between them. These splines are in constant mesh with eight alternate long and short splines 70A and 70B on the interior of a locking sleeve 70.

Figure 3:
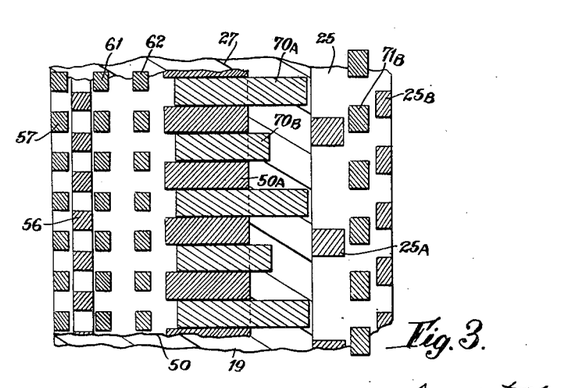
Fig. 3 is a developed section taken on the line 3—3 in Fig. 1.

The locking bush 25 is provided with two rings of short axial splines 25A and 25B spaced by a circumferential gap 25C. There are eight uniformly distributed splines 25B each having a width (in the circumferential direction) equal to that of the grooves between them, and there are four uniformly distributed splines 25A having the same width as the splines 25B and so positioned as to register, in an axial direction, with grooves between the splines 25B (Fig. 3.)

A second locking sleeve 71 is slidably mounted on the sleeve 70, and is provided with internal axial splines 71A in constant mesh with splines 70C on the sleeve 70, whereby the sleeves 70 and 71 are prevented from rotating relatively to each other. The sleeve 71 is also provided with eight uniformly distributed axial splines 71B each having a width equal to that of the grooves between them. The splines 71B are so positioned as to register, in an axial direction, with the grooves between the splines 70A and 70B, and their length is such that they can be accommodated in the gap 25C. When the mechanism is in the configuration shown in Figs. 1 and 3, the end faces of the splines 70B half overlap, in the circumferential sense, the end faces of the splines 25A.

Figure 4:
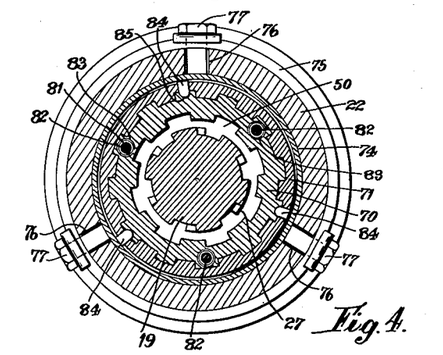
Fig. 4 is a sectional end elevation on the line 4—4 in Fig. 1.

The locking sleeves 70 and 71 are provided with shoulders 72 and 73 co-operating with the internally flanged ends of a selector tube 74 housed in the sleeve 22. A selector ring 75 is slidably mounted on the sleeve 22, which is provided with three slots 76 (Fig. 4). Each of these slots accommodates a pin 77, by which the tube 74 is rigidly connected to the ring 75. A selector fork 78, mounted on a selector rod 79, is engaged in a groove 80 in the ring 75. The locking sleeves 70 and 71 are urged into the relationship shown in Fig. 1 by three light helical compression springs 81. These springs are guided by pins 82 screwed to the sleeve 70 at the bottom of counterbores 83. Three radial pins 84 are fixed in the sleeve 71 and project into grooves 85 in the sleeve 70. These grooves are of such a length that the pins 84 prevent the sleeves 70 and 71 from being forced by the springs 81 far enough apart for both the shoulders 72 and 73 to rub simultaneously against the flanged ends of the tube 74.

When the parts are in the configuration shown in Fig. 1, the axial space between the ends of the splines 70A and 25A is somewhat shorter than the axial space between the ends of the splines 71B and 25B. Consequently, when the selector tube 74 is urged to the right to cause the splines 70A to abut the ends of the splines 25A, there will still be a substantial axial space between the ends of the splines 71B and 25B.

The control mechanism (Figs. 1, 5, 18, 19 and 20) includes a gear-change lever 90 fixed to a shaft 91 slidably journaled in a bracket 92 which is mounted in the vehicle in fixed relationship to the gear casing 10. To the lower end of the lever 90 is fixed a pin 93 engageable alternatively in holes 94 and 95 formed respectively in arms 98 and 99 which are pivotally mounted on the bracket 92 so as to rock in planes parallel to the plane of movement of the lever 90. The arms 98 and 99 are pivotally connected respectively by links 100 and 101 to the selector rods 79 and 37. The rod 37 has three notches 37A, 37B and 37C co-operating with a spring-loaded locating plunger 96 and corresponding respectively to the "forward," "neutral" and "reverse" positions. The selector rod 79 has three notches 79A, 79B and 79C co-operating with a spring-loaded locating plunger 97 and corresponding respectively to "high," "low" and "middle" speed positions.

Figure 5:
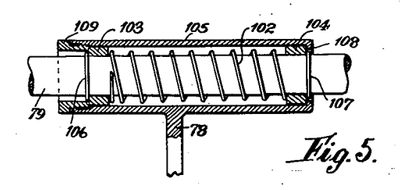
Fig. 5 is a sectional side elevation of a detail appearing in Fig. 1, Figs. 6, 8, 10, 12, 14 and 16 are sectional side elevations of a portion of the gearing, showing the parts in different configurations respectively.

A resilient connection is provided between the selector rod 79 and the fork 78. As shown in Fig. 5, a helical spring 102 is placed round the rod 79, being normally partly compressed between two collars 103 and 104 slidable on the rod 79 and within a tubular body 105 of the fork 78. Snap rings 106 and 107 are engaged in circumferential grooves in the rod 79 and form abutments for the collars 103 and 104 respectively. One end of the tube 105 has an inturned flange 108 shaped to engage the collar 104 and to clear the snap ring 107 and the other end of the tube is provided with a hollow screwed plug 109 shaped to engage the collar 103 and to clear the snap ring 106. If the rod 79 is moved to the right and the fork is prevented from following, the snap ring 106 forces the collar 103 to the right and further compresses the spring 102 against the collar 104 which bears against the flange 108. When the fork is free to move, the spring 102 expands, forcing the fork to the right until the collar 104 is positively arrested by the snap ring 107. A similar action can take place when the rod is moved to the left.

Figures 18, 19, 20:
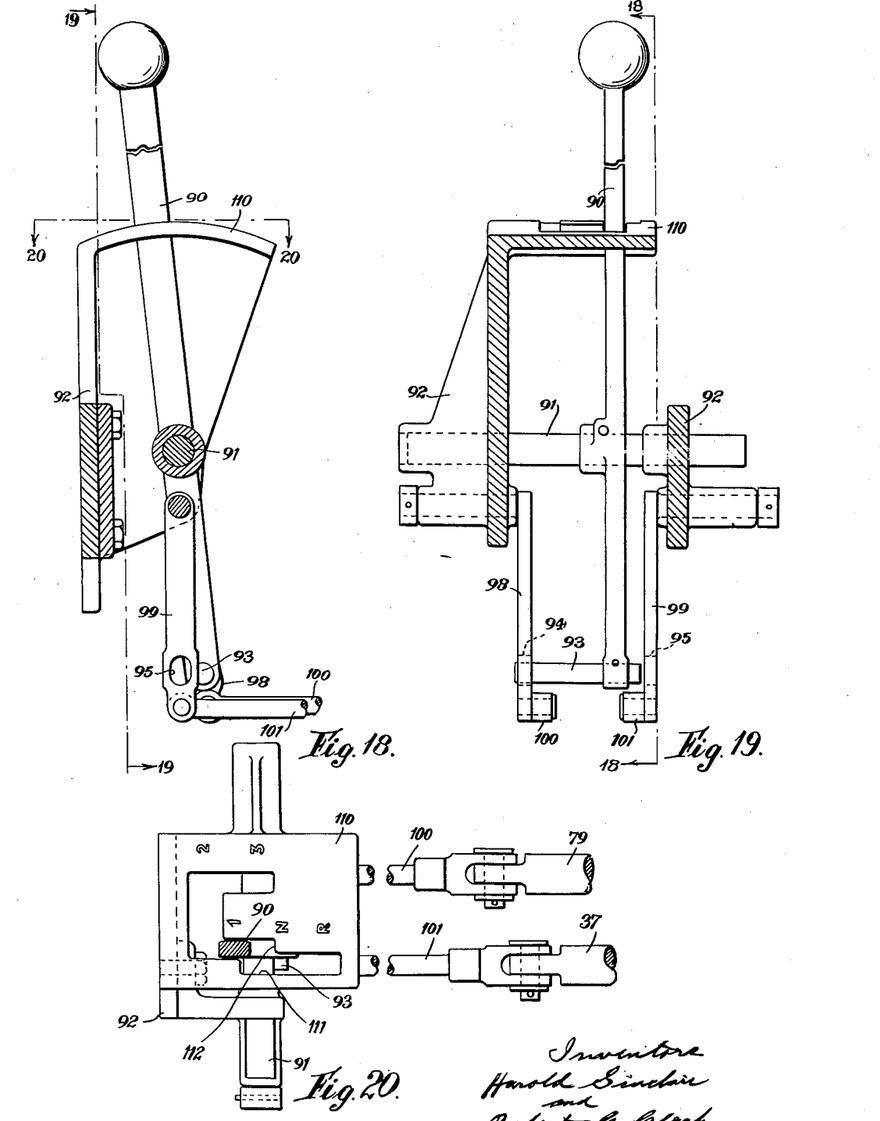
Fig. 18 is a sectional side elevation of a gear-change lever assembly, taken on the line 18—18 in Fig. 19.
Fig. 19 is a sectional end elevation taken on the line 19—19 in Fig. 18.
Fig. 20 is a sectional plan taken on the line 20—20 in Fig. 18.

The gear lever 90 operates in a gate 110 having the shape shown in Fig. 20 and providing a continuous passage from reverse (R), through neutral (N), low (1) and middle (2) speed positions, to the high-speed position (3).

The strengths of the various springs are so selected that the compression of the spring 102 of the selector fork 78 when in its normal position, as in Fig. 5, is sufficient to maintain compressed the springs 81 of the locking sleeves; and the restraint imposed to movement of the selector rod 79 by the spring-loaded locating plunger 97 is sufficient to hold this rod stationary when the spring 102 is fully compressed.

The gearing operates as follows.

In starting from rest on low speed, the gear lever is in the position shown in Figs. 18, 19 and 20. When the main clutch (not shown) engages, the input shaft 11 rotates and causes the teeth 57 to rotate with the shaft 11, the teeth 61 to rotate forwards at a lower speed, and the sleeve 22 with the teeth 62 to rotate forwards at a still lower speed. If the nut 50 happens to be in its extreme left-hand position, the teeth 57 co-operate with the teeth 56 to move the nut to the position shown in Fig. 1. Then one of the pawls 67 is engaged by a tooth 61 which moves the nut to the right until the teeth 56 and 61 engage. The movement continues until one of the pawls 67 engages a tooth 62 which draws the nut against the stop 26 and brings the teeth 56 and 62 into mesh. Power is now transmitted through the gear wheels 12 and 13, the countershaft 14, the gear wheels 32 and 31, the gear wheel 33 acting as a jaw clutch, the sleeve 22 and thence through the nut 50, the splines 27 and the stop 26 to the output shaft 19.

Figure 6:
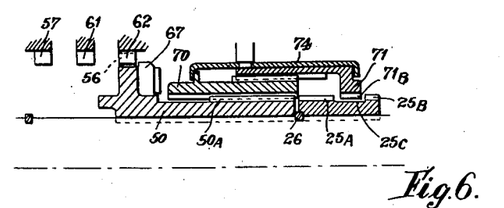
Figure 7:
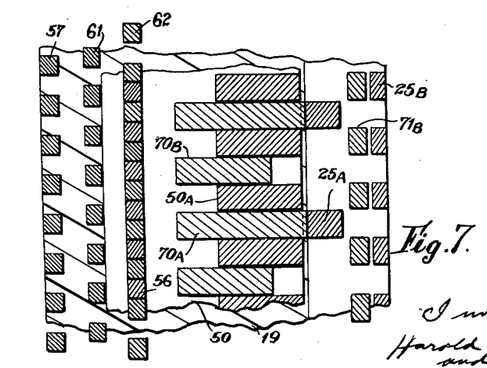
Figs. 7, 9, 11, 13, 15 and 17 are developed sections taken in the same way as Fig. 3, but showing the parts in the configurations of Figs. 6, 8, 10, 12, 14 and 16 respectively.

To change to middle speed, the gear lever 90 is moved to position 2 (Fig. 20) causing the selector rod 79 to move to the right until the notch 79C is engaged by the locating plunger 97. Since the ends of the splines 70A on the locking sleeve 70 abut against the ends of the splines 25A on the locking bush, as shown in Figs. 6 and 7, the spring 102 of the selector fork 78 is compressed. The engine is now retarded. As the inertia of the vehicle causes the output shaft 19 to continue rotating without substantial fall of speed, the teeth 62 on the low-speed sleeve 22 co-operate with the nut teeth 56 to move the latter to the left until the pawls 63 come in the path of the middle-speed teeth 61. At first the teeth 61 ratchet over the pawls 63, but, as the engine speed continues to fall and in consequence the speed of the teeth 61 tends to drop below that of the nut 50, a tooth 61 engages a pawl 63 and causes the nut to move farther to the left until the teeth 56 mesh with the teeth 61. These teeth co-operate to maintain the travel of the nut to the left.

This movement of the nut to the left has caused the locking sleeves 70 and 71 to rotate backwards relatively to the locking bush 25 on the output shaft, and, at the instant when the teeth 56 and 61 come fully into mesh, as will be clear from Fig. 7, the long splines 70A on the locking sleeve 70 slip round the trailing edges of the splines 25A and permit the locking sleeves 70 and 71 to move to the right under the influence of the selector spring 102. At this instant the splines 71B on the locking sleeve 71 are in register with the grooves between the splines 25B on the locking bush 25. However, since the action of the teeth 56 and 61 maintains the movement of the nut to the left and hence its backward rotation relative to the locking bush 25, and since, at the instant when the splines 70A slip round the splines 25A, there is still a substantial axial space between the splines 71B and 25B, during the time required for the selector mechanism to operate to move the locking sleeve 71 far enough to the right to take up this axial space, the relative rotation of the nut and the output shaft has brought the splines 71B into such a position that their ends abut against the ends of the splines 25B, so that the locking sleeve 71 is prevented from moving farther to the right, the two locking sleeves 70 and 71 being telescoped together, compressing the springs 81. When the nut reaches the position shown in Fig. 8, its movement to the left ceases, and the pawls 67 ratchet over the teeth 61 since, owing to the continued retardation of the engine, the teeth 61 are now rotating slower than the nut. At the same time, as the teeth 57, which rotate with the input shaft, are still rotating faster than the nut 50, the pawls 63 ratchet over the teeth 57. The four long splines 70A on the locking sleeve 70 are now spaced circumferentially from the teeth 25A on the locking bush 25, as shown in Fig. 9.

The engine is now accelerated again before the speed of the shaft 11 has fallen to that of the shaft 19, and as soon as the middle-speed teeth 61 tend to rotate faster than the output shaft 19, one of the pawls 67 is engaged by a tooth 61 and the nut 50 is caused to move to the right, the nut teeth 56 meshing with the teeth 61. The consequent forward rotation of the nut 50 on the output shaft 19 causes the leading faces of the long splines 70A to approach the trailing faces of the splines 25A, and, as the teeth 56 and 61 become fully meshed (Fig. 10), the splines 70A engage the splines 25A (Fig. 11) and these splines thus cooperate to prevent further movement of the nut to the right. At the same time the splines 71B come into register with the grooves between the splines 25B, and the springs 81 cause the locking sleeve 71 to move to the right until the splines 25B and 71B are in mesh with each other. The gearing is now in condition for transmitting both driving and reverse torque (namely, the torque in the sense that occurs when the engine is retarded and power is temporarily transmitted from the output shaft to the engine) on the intermediate-speed ratio, the driving power being transmitted from the shaft 11 by the wheels 12, 13, 18 and 15, the nut 50 and the locking splines 50A, 70A and 25A to the output shaft 19.

Figure 8:
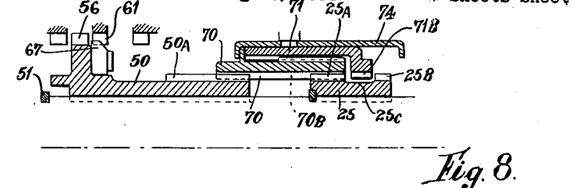
Figure 9:
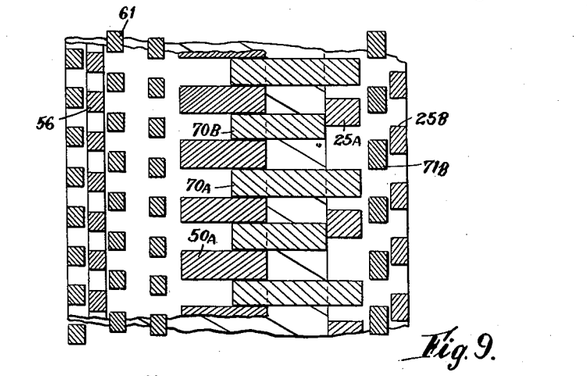
Figure 10:
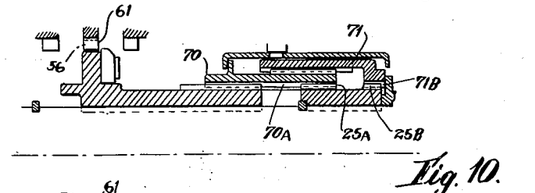
Figure 11:
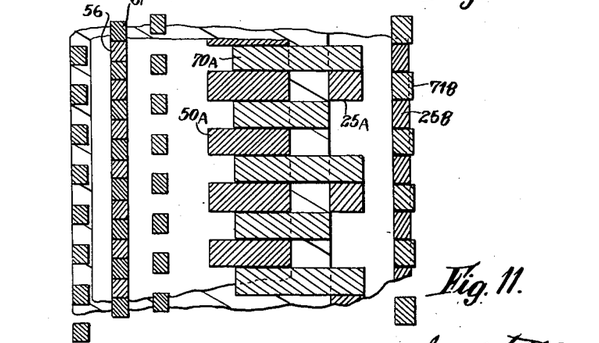

It will be evident that the operation of changing from low to middle speed involves maintaining the middle-speed coupling 56, 61 in a bi-directionally-free condition with the locking sleeves in the positions shown in Figs. 6 and 7 until the ratio of speeds of the input and output shafts has fallen to a value between the high- and middle-speed ratios, then automatically converting the middle-speed coupling into its free-wheeling condition, as shown in Figs. 8 and 9, accelerating the engine until this free-wheel coupling engages, and finally locking it bidirectionally, as shown in Figures 10 and 11. As the drive is picked up by engagement of a free-wheeling coupling, and as this coupling cannot be bidirectionally locked unless its driving and driven parts are running in synchronism, there is no risk of shock engagement.

Figure 12:
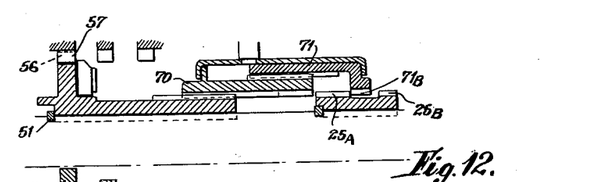
Figure 13:
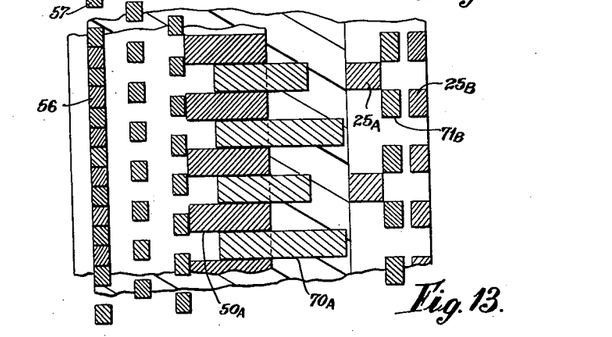
Figure 14:
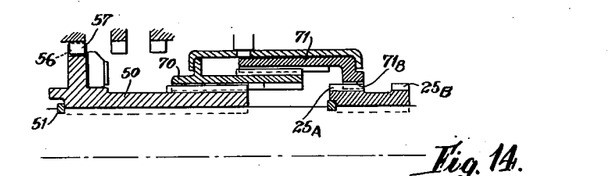
Figure 15:
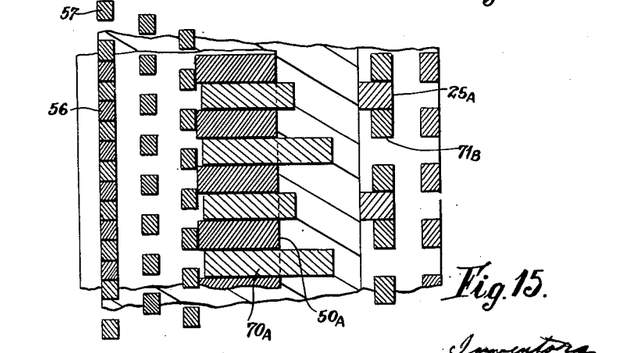

To change from middle to high speed, the gear lever 90 is moved, while the engine is still transmitting power, to position 3 (Fig. 20), causing the selector rod 79 to move to the position where the notch 79A is engaged by the locating plunger 97. As the splines 71B and 25B are not transmitting torque, the locking sleeve 71 is free to move to the left until the splines 71B abut the splines 25A, the difference between the travel of the selector rod 79 and the locking sleeve 71 being accommodated by the selector spring 102. As the locking sleeve 70 is still transmitting driving torque, it remains held by friction in the position shown in Figs. 10 and 11, the springs 81 being compressed. The engine is now retarded. As soon as the driving torque vanishes, the locking sleeve 70 is moved by the springs 81 to the position shown in Fig. 12. As the speed of the input shaft 11 falls relatively to that of the output shaft 19, the middle-speed teeth 61 co-operate with the nut teeth 56 to move the nut to the left to the position shown in Figs. 1 and 3, the pawls 63 and 67 ratcheting over the teeth 57 and 61. When the speed of the input shaft 11 tends to drop below that of the output shaft, one of the pawls 63 engages a tooth 57 and causes the nut to move to the left against the stop 51, bringing the nut teeth 56 fully into mesh with the high-speed teeth 57. The input and output shafts are now maintained in synchronism by reverse torque, the nut 50 co-operating with the high-speed teeth 57 to form an inverted unidirectional coupling. The condition of the parts just as synchronism is being attained is shown in Figs. 12 and 13. Immediately synchronism has occurred, the splines 71B register with the grooves between the splines 25A, so that the selector spring 102 can operate to bring the locking sleeves 70 and 71 into the positions shown in Figs. 14 and 15, with the splines 25A and 71B meshed together. The nut 50 is thereby locked in the extreme left-hand position, and when the engine again generates power the nut is prevented from moving on the output shaft and the drive is transmitted from the shaft 11 to the nut 50 and thence to the output shaft 19 through the locking sleeves 70 and 71 and the splines 71B and 25A.

The described means of engaging the high-speed drive form the subject of patent application Serial No. 169,973, filed October 20, 1937.

To change from high to middle speed the gear lever 90 is moved to the middle-speed position and the engine is momentarily retarded to unload the locking splines 71B and 25A and permit the locking sleeve 71 to move to the right under the influence of the springs 81. The engine is then accelerated, and the high-speed teeth 57 co-operate with the nut teeth 56 to move the nut to the right, the middle-speed engaging as hereinbefore described with reference to Figs. 10 and 11.

To change from middle to low speed, the gear lever is moved to shift the selector rod 79 to the position shown in Fig. 1 and thus bring the splines 71B into the circumferential gap 25C. The locking sleeve 70, owing to the drive torque transmitted by it, is momentarily held by the friction acting between the splines in the position shown in Figs. 10 and 11, and the springs 81 are compressed. The engine is now momentarily retarded to remove the drive torque and allow the locking sleeve 70 to be moved by the springs 81 to the position shown in Fig. 1, and as the engine is again accelerated, the low speed is established as hereinbefore described.

Figure 16:
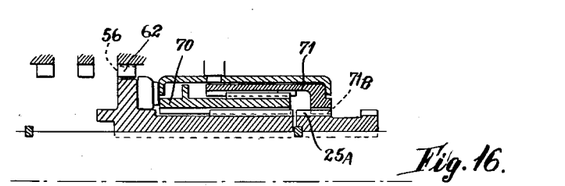
Figure 17:
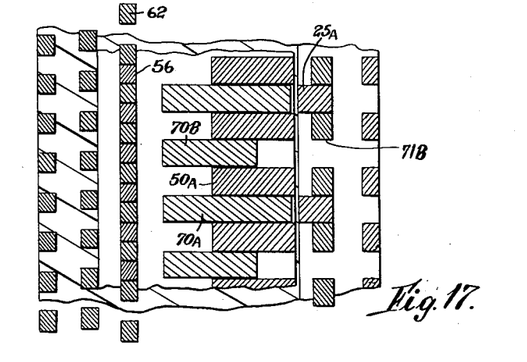

To obtain reverse, the output shaft being stationary and the gear lever in position 1, the input shaft 11 is allowed to rotate forwards just far enough to establish low speed and the gear lever 90 is thereupon moved to the position R. As the gear lever moves into contact with the portion 112 of the gate (Fig. 20), the selector rod 79 is moved thereby to the position where its notch 79A is engaged with the locating plunger 97. The locking splines 25A and 71B are thereby meshed together, as shown in Figs. 16 and 17, the nut teeth 56 remaining in mesh with the low-speed teeth 62. As the gear lever moves sideways into contact with the portion 111 of the gate, the pin 93 on the gear lever (Fig. 19) disengages from the hole 94 in the arm 98 and engages in the hole 95 in the arm 99. As the gear lever finally moves to position R, it shifts the selector rod 37 through the neutral position to the position where the notch 37C is engaged with the locating plunger 96. The slidable gear wheel 33 is thereby slid out of engagement with the wheel 31 and into mesh with the reverse idler 40. When the main clutch is re-engaged, the drive is transmitted from the shaft 11 through the wheels 12 and 13, the countershaft 14, the wheels 32, 41, 40 and 33, the sleeve 22 and the nut 50, and thence through the locking sleeves 70 and 71 and the splines 71B and 25A to the output shaft 19.

In some constructions embodying the improved synchro-coupling, it is desirable to omit the sleeve 22 and the teeth 62 from the design shown in Fig. 1. Consequently when the locking sleeves are in the configuration shown in Fig. 1, and the teeth 61 are rotated forwards faster than the output shaft 19 so that the nut is rotated forwards relatively to the output shaft, the inertia of the nut will carry it to the right against the stop 26 after the teeth 56 have disengaged from the teeth 61. Under these conditions not only is the coupling bidirectionally free, but all the pawls are out of the paths of teeth and do not click. The coupling can be restored to an operative condition by operating the control means to move the selector tube 74 to its extreme left-hand position. This causes the left-hand end of the locking sleeve 78 to engage the pivot pins of the pawls 67 and thereby move the nut to the left far enough for its pawls 63 to come in the path of the teeth 61.

If it is desired to obtain at will a free-wheeling action between the driving members 59, 60 and the output shaft 19 (which may be convenient where the driving member 58 and teeth 57 are omitted and the extreme left-hand position of the nut is that shown in Fig. 1) the lengths and axial positions of the locking splines may be so selected as to permit the right-hand ends of the splines 70A to mesh with the left-hand ends of the splines 25A while the splines 71B are still in the circumferential gap 25C.

We claim:

1. A synchro-coupling comprising a toothed first member, a second member, an intermediate member having teeth engageable with the teeth of said first member, said intermediate member being so engaged with said second member as to be constrained to move helically with respect thereto upon relative rotation between said intermediate and second members, and said intermediate member being capable, in the course of such helical movement, of axial displacement relative to said first member from a first position where said teeth are disengaged, through a second position where said teeth are engaged, to a third position where said teeth are again disengaged, the coupling also comprising two subsidiary ratchet drives capable of coupling said first and intermediate members and serving to effect engagement of said toothed members without clashing by moving said intermediate member from said first and third positions respectively to said second position, upon relative angular displacement of said first and second members in two directions respectively, and control means operable for preventing said intermediate member from passing beyond said second position when moved from at least one of said first and third positions.

2. A synchro-coupling comprising a toothed first member, a second member co-axial with said first member, an intermediate member having teeth engageable with the teeth of said first member, said intermediate member being so engaged with said second member as to be constrained to move helically with respect thereto upon relative rotation between said intermediate and second members, and said intermediate member being capable, in the course of such helical movement, of axial displacement relative to said first member from a first position where said teeth are disengaged, through a second position where said teeth are engaged, to a third position where said teeth are again disengaged, the coupling also comprising a first pawl mounted on one of said toothed members and engageable with teeth on the other of said toothed members, a second pawl mounted on one of said toothed members and engageable with teeth on the other of said toothed members, said pawls being so positioned as to effect engagement of said toothed members without clashing by moving said intermediate member from said first and third positions respectively to said second position, upon relative angular displacement of said first and second members in two directions respectively, and control means operable for preventing said intermediate member from passing beyond said second position when moved from at least one of said first and third positions.

3. A synchro-coupling comprising a toothed first member, a second member co-axial with said first member, an intermediate member having teeth engageable with the teeth of said first member, said intermediate member being so mounted on said second member as to be constrained to move helically thereon upon relative rotation between said intermediate and second members, and said intermediate member being capable, in the course of such helical movement, of axial displacement relative to said first member from a first position where said teeth are disengaged through a second position where said teeth are engaged, to a third position where said teeth are again disengaged, the coupling also comprising a first pawl mounted on one of said toothed members and engageable with teeth on the other of said toothed members, a second pawl mounted on one of said toothed members and engageable with teeth on the other of said toothed members, said pawls being so positioned as to effect engagement of said toothed members without clashing by moving said intermediate member from said first and third positions respectively to said second position, upon relative angular displacement of said first and second members in two directions respectively about their common axis, and a slidable control sleeve operable for coupling together said second and intermediate members with rotational backlash which is taken up as said toothed members attain full engagement.

4. A synchro-coupling comprising a toothed first member, a second member co-axial with said first member, an intermediate member having teeth engageable with the teeth of said first member, said intermediate member being so mounted on said second member as to be constrained to move helically thereon upon relative rotation between said intermediate and second members, and said intermediate member being capable, in the course of such helical movement, of axial displacement relative to said first member from a first position where said teeth are disengaged, through a second position where said teeth are engaged, to a third position where said teeth are again disengaged, the coupling also comprising a first pawl mounted on one of said toothed members and engageable with teeth on the other of said toothed members, a second pawl mounted on one of said toothed members and engageable with teeth on the other of said toothed members, said pawls being so positioned as to effect engagement of said toothed members without clashing by moving said intermediate member from said first and third positions respectively to said second position, upon relative angular displacement of said first and second members in two directions respectively about their common axis, a slidable control sleeve operable for coupling together said second and intermediate members with rotational backlash which is taken up as said toothed members attain full engagement, a locking member operable in consequence of such engagement for eliminating said backlash and common control means for actuating said control sleeve and locking member.

5. A synchro-coupling comprising a toothed first member, a second member co-axial with said first member, an intermediate member having teeth engageable with the teeth of said first member, said intermediate member being so mounted on said second member as to be constrained to move helically thereon upon relative rotation between said intermediate and second members, and said intermediate member being capable, in the course of such helical movement, of axial displacement relative to said first member from a first position where said teeth are disengaged, through a second position where said teeth are engaged, to a third position where said teeth are again disengaged, the coupling also comprising a first pawl mounted on one of said toothed members and engageable with teeth on the other of said toothed members, a second pawl mounted on one of said toothed members and engageable with teeth on the other of said toothed members, said pawls being so positioned as to effect engagement of said toothed members without clashing by moving said intermediate member from said first and third positions respectively to said second position, upon relative angular displacement of said first and second members in two directions respectively about their common axis, and said intermediate member being also movable on said second member to a fourth position in which neither of said pawls is in the path of said teeth with which they co-operate, and control means operable for preventing said intermediate member from passing beyond said second position when moved from at least one of said first and third positions and for moving said intermediate member from said fourth to said third position.

6. A change-speed gearing yielding at least two speed ratios between its input shaft and its output shaft and comprising a gear selecting clutch including two members which in a first condition of the clutch are free to rotate in both senses relatively to each other and which are engageable together to establish the higher speed ratio, controllable means for causing said clutch members, in a second condition of said clutch, to engage together automatically to cause transmission of driving torque from said input shaft to said output shaft and to free wheel under torque in the sense opposed to said driving torque, and means for locking said clutch members bidirectionally together so that they can transmit torques in both senses, said controllable means being operable for changing said clutch from said first to said second condition only whilst the ratio of the speeds of said input and output shafts is lower than said higher-speed ratio, and said controllable means including a preselector locking member serving to lock said clutch members bidirectionally together in consequence of their engagement under driving torque.

7. A change-speed gearing yielding at least three speed ratios between its input and output shafts, wherein the elements for transmitting power on the high-speed and a middle-speed ratio include a common gear-selecting clutch having three co-axial relatively rotatable members, the first and third of which have teeth, the first and second of which are engaged together to establish said middle speed and the third and second of which are engaged together to establish said high speed, said clutch comprising a toothed intermediate member so engaged with said second member as to be constrained to move helically with respect thereto from a first position where said teeth are disengaged, through a second position where said first and intermediate members are in mesh, through a third position where said teeth are disengaged to a fourth position where said third and intermediate members are in mesh, pawls on at least one of said toothed members positioned to engage teeth on the remainder of said toothed members to effect engagement of said first and intermediate members by moving said intermediate member from said first and third positions respectively to said second position upon the ratio of speeds of said input and output shafts being lower than and exceeding respectively said middle-speed ratio and to effect engagement of said third and intermediate members by moving said intermediate member from said third to said fourth position upon the ratio of speeds of said input and output shafts tending to become lower than said high-speed ratio, and control means operable alternatively for locking said intermediate member in said fourth position and for preventing said intermediate member from passing beyond said second position when moved from said third position.

8. A change-speed gearing as claimed in claim 7, wherein said control means include a locking member operable for locking said intermediate member in said second position.

9. A change-speed gearing as claimed in claim 7, wherein the low-speed transmission path includes a toothed member co-axial with said intermediate member and positioned to be engaged by said intermediate member to establish low speed on movement of said intermediate member from said second position through said first position to a low-speed position.

10. A change-speed gearing as claimed in claim 7, wherein said control means include a locking member operable for coupling said second and intermediate members together with angular backlash.

11. A change-speed gearing as claimed in claim 7, wherein said control means include a first locking member operable for coupling said second and intermediate members together with angular backlash and a second locking member operable for thereafter coupling said second and intermediate members together without substantial backlash.

12. A change-speed gearing as claimed in claim 7, wherein said control means include two locking members constrained to rotate respectively with said second and intermediate members, a selector capable of sliding one of said locking members with respect to the said member with which it is constrained to rotate, and a projection on one of said locking members engageable alternatively in two circumferentially staggered and axially spaced recesses in the other of said locking members.

13. A change-speed gearing as claimed in claim 7, wherein said control means include a locking sleeve slidable on but constrained to rotate with said intermediate member, two axially spaced rings of locking splines rigid with said second member, the splines in one of said rings being circumferentially staggered with respect to the splines in the other of said rings, internal splines on said locking sleeve engageable with angular backlash with one of said rings, a second locking sleeve constrained to rotate with and slidable with respect to said first locking sleeve, said second sleeve having internal splines engageable alternatively with said rings, and a selector member operatively connected with said sleeves.

14. A change-speed gearing as claimed in claim 7, wherein said control means include a first locking sleeve slidable on and constrained to rotate with said intermediate member, a second locking sleeve telescopically mounted on said first sleeve, resilient means urging said sleeves apart, a selector embracing both of said sleeves, two axially spaced rings of locking splines rigid with said second member, the splines in one of said rings being circumferentially staggered with respect to the splines in the other of said rings, internal splines on an end of said first sleeve engageable with angular backlash with one of said rings, and internal splines on said second sleeve engageable alternatively with said rings.

15. Change-speed gearing comprising a first main shaft, a second main shaft co-axial therewith, a countershaft, a gear train connecting said first shaft to said countershaft, a middle-speed gear wheel rotatable about said first shaft and meshing with a gear wheel fixed to said countershaft, a sleeve rotatable about said second shaft, a gear train for connecting said sleeve to said countershaft, a nut engaged with helical splines on said second shaft, said nut having teeth engageable, as said nut moves helically on said splines, with teeth on said sleeve, with teeth on said middle-speed wheel and with teeth on said first shaft, at least one of said toothed members having pawls co-operating with other of said toothed members and positioned to maintain helical movement of said nut in one direction as the relative speed of said main shafts varies in one sense and in the other direction as said relative speed varies in the other sense, and control means operable for locking said nut in at least one limit of its range of movement and for preventing said nut, when moving in one direction at least, from passing beyond the position where its teeth are in mesh with the teeth of said middle-speed wheel.

16. A change-speed gearing having a driving shaft, a driven shaft co-axial therewith, a countershaft, a gear train connecting said driving shaft to said countershaft, an intermediate-speed member rotatable about said driving shaft, a gear train connecting said member to said countershaft, a low-speed train for connecting said countershaft to said driven shaft, a nut engaged on helical splines on said driven shaft and having teeth engageable alternatively with teeth on said intermediate-speed member and with teeth on said input shaft, said teeth being so positioned that, as said nut rotates in the forward direction relatively to said driven shaft said nut is disengaged from said input-shaft teeth, thereafter engaged with said intermediate-member teeth, and finally disengaged from said intermediate-member teeth, pawls on at least one of said toothed members co-operating with the remainder of said toothed members to rotate said nut backwards relatively to said driven shaft and into mesh with the teeth on said driving shaft as the speed of said driving shaft falls relative to that of the driven shaft and to rotate said nut forwards and into mesh with said intermediate-member teeth as said relative speed rises, and control means operable alternatively for locking said nut in engagement with said driving-shaft teeth and for preventing said nut, as it moves away from said driving-shaft teeth, from running through the position where its teeth are in mesh with said intermediate-member teeth.

HAROLD SINCLAIR.
ROBERT CECIL CLERK.